US011174750B2

(12) United States Patent
Gysling et al.

(10) Patent No.: US 11,174,750 B2
(45) Date of Patent: Nov. 16, 2021

(54) REAL TIME AERODAMPING MEASUREMENT OF TURBOMACHINE

(71) Applicant: Raytheon Technologies Corporation, Farmington, CT (US)

(72) Inventors: Daniel L. Gysling, South Glastonbury, CT (US); Glenn N. Levasseur, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1331 days.

(21) Appl. No.: 15/256,411

(22) Filed: Sep. 2, 2016

(65) Prior Publication Data

US 2018/0066535 A1 Mar. 8, 2018

(51) Int. Cl.
*F01D 21/00* (2006.01)
*F01D 21/14* (2006.01)
(Continued)

(52) U.S. Cl.
CPC .......... *F01D 21/003* (2013.01); *F01D 17/04* (2013.01); *F01D 21/14* (2013.01); *G01H 1/003* (2013.01);
(Continued)

(58) Field of Classification Search
CPC ........ F01D 21/003; F01D 21/14; F01D 17/04; F01D 5/16; F01D 5/22; F01D 5/26; F01D 5/10; F01D 25/04; F01D 25/06; G01H 1/003; G01H 1/006; G01M 15/14; F05D 2220/36; F05D 2220/32; F05D 2240/30; F05D 2260/83; F05D 2270/334; F05D 2270/808; F05D 29/668
See application file for complete search history.

(56) References Cited

U.S. PATENT DOCUMENTS 4,073,600 A 2/1978 Doman
4,475,385 A 10/1984 Farmer
(Continued)

FOREIGN PATENT DOCUMENTS

EP 1273763 A2 1/2003
EP 2241726 A2 10/2010

OTHER PUBLICATIONS

European Search Report for European Application No. 17189169.0, dated Dec. 21, 2017.
(Continued)

*Primary Examiner* — Igor Kershteyn
*Assistant Examiner* — Joshua R Beebe
(74) *Attorney, Agent, or Firm* — Carlson, Gaskey & Olds, P.C.

(57) ABSTRACT

A method of health monitoring of a gas turbine engine includes mounting a detection system configured to detect an aeromechanical damping characteristic of a row of airfoils of a gas turbine. An actual aeromechanical damping characteristic of the row of airfoils is measured with the detection system. An output signal is generated indicative of the actual aeromechanical damping characteristic of the row of airfoils. A current flutter characteristic is determined based on the output signal indicative of the actual aeromechanical damping characteristic of the row of airfoils. An airfoil health monitoring system for gas turbine engine and a gas turbine engine are also disclosed.

16 Claims, 4 Drawing Sheets

(51) Int. Cl.
*G01H 1/00* (2006.01)
*F01D 17/04* (2006.01)
*G01M 15/14* (2006.01)

(52) U.S. Cl.
CPC ............ *G01H 1/006* (2013.01); *G01M 15/14* (2013.01); *F05D 2220/32* (2013.01); *F05D 2220/36* (2013.01); *F05D 2240/30* (2013.01); *F05D 2260/83* (2013.01); *F05D 2270/334* (2013.01); *F05D 2270/808* (2013.01)

(56) References Cited

U.S. PATENT DOCUMENTS

| | | | | |
|---|---|---|---|---|
| 5,005,353 | A * | 4/1991 | Acton | F01D 17/02 415/119 |
| 5,206,816 | A | 4/1993 | Hill et al. | |
| 5,490,759 | A * | 2/1996 | Hoffman | F01D 5/26 415/10 |
| 6,339,878 | B1 | 1/2002 | Owen et al. | |
| 6,582,183 | B2 | 6/2003 | Eveker et al. | |
| 6,584,849 | B2 | 7/2003 | Loftus et al. | |
| 7,383,136 | B1 | 6/2008 | Griffin et al. | |
| 7,509,862 | B2 | 3/2009 | Cohen et al. | |
| 8,646,251 | B2 | 2/2014 | Rosenkrans et al. | |
| 8,742,944 | B2 * | 6/2014 | Mitchell | F01D 17/02 340/870.01 |
| 9,810,090 | B2 * | 11/2017 | Ivanovich | F01D 21/003 |
| 2005/0198967 | A1 | 9/2005 | Subramanian | |
| 2010/0257838 | A1 * | 10/2010 | Mazzaro | F01D 17/02 60/39.091 |
| 2012/0102701 | A1 * | 5/2012 | Borufka | F01D 5/26 29/402.01 |
| 2013/0111915 | A1 * | 5/2013 | Schwarz | F01D 17/02 60/773 |
| 2013/0197740 | A1 * | 8/2013 | Hagel | F16F 15/002 701/32.1 |
| 2013/0304418 | A1 * | 11/2013 | Gendrich | F01D 17/02 702/182 |
| 2014/0052410 | A1 | 2/2014 | Tralshawala et al. | |
| 2015/0322813 | A1 | 11/2015 | Tralshawala et al. | |
| 2016/0222818 | A1 | 8/2016 | Ivanovich et al. | |

OTHER PUBLICATIONS

Banaszuk et al., "Active Control of Flutter in Turbomachinery Using Off Blade Actuators Sensors. Part II: Control Algorithm" Proceedings of the 41st IEEE, Conference on Decision and Control, Las Vegas, Nevada USA, December, pp. 3704-3709.

Rey et al., "Active Control of Flutter in Turobmachinery Using Off Blade Actuators Sensors: Experimental Results" 41st Aerospace Sciences Meeting and Exhibit, Reno, Nevada, Jan. 6-9, 2003, pp. 1-6.

Banaszuk et al., "Active Control of Flutter in Turbomachinery Using Off Blade Actuators and Sensors. Part I: Modeling for Control", IFAC, 2002, pp. 1-6.

* cited by examiner

REAL TIME AERODAMPING MEASUREMENT OF TURBOMACHINE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Flutter is an aeromechanical instability of turbomachine airfoils that occurs when an airfoil becomes self-excited. Flutter is commonly defined as a self-excited aero-elastic instability that can lead to destructive levels of vibration. Flutter is not typically encountered during engine operation because turbine engine manufacturers test to determine where flutter occurs on an operating map to determine a flutter boundary and then set operational limits to prevent such an occurrence. The operational limits and maintenance protocols defined in view of engine testing include safety margins relative to the determined flutter boundary. The margins account for other known engine operating characteristics that can contribute to the occurrence of flutter. Accordingly, maintenance procedures along with engine operating limits determined based on the margins and limited testing may result in unnecessarily constraining engine performance and unnecessary maintenance actions.

Turbine engine manufacturers continue to seek further improvements to engine operation including improvements to propulsive and economic efficiencies.

SUMMARY

In a featured embodiment, a method of health monitoring of a gas turbine engine includes mounting a detection system configured to detect an aeromechanical damping characteristic of a row of airfoils of a gas turbine. An actual aeromechanical damping characteristic of the row of airfoils is measured with the detection system. An output signal is generated indicative of the actual aeromechanical damping characteristic of the row of airfoils. A current flutter characteristic is determined based on the output signal indicative of the actual aeromechanical damping characteristic of the row of airfoils.

In another embodiment according to the previous embodiment, includes comparing the determined flutter characteristic to a predefined flutter boundary and determining if at least one of a maintenance activity and modification to engine operating constraints is warranted based on the comparison of the determined flutter characteristic to the predefined flutter boundary.

In another embodiment according to any of the previous embodiments, includes determining a set of engine parameters that define a flutter boundary and defining a flutter margin for the set of engine operating parameters at a value of the set engine operating parameters such that the set of engine operating parameters does not approach the flutter boundary.

In another embodiment according to any of the previous embodiments, includes determining the flutter boundary by measuring aeromechanical damping at non-flutter operating conditions and predicting the flutter boundary based on changes to aeromechanical damping at the non-flutter operating conditions.

In another embodiment according to any of the previous embodiments, the aeromechanical damping characteristic includes a zero aeromechanical damping value.

In another embodiment according to any of the previous embodiments, includes determining an aeromechanical damping characteristic of the engine operating parameter and defining the flutter margin based on the determined aeromechanical damping characteristic.

In another embodiment according to any of the previous embodiments, includes constraining engine operation based on the aeromechanical damping characteristic corresponding with the engine operating parameter.

In another embodiment according to any of the previous embodiments, includes recording measured actual aeromechanical damping characteristics of the row of airfoils at predefined intervals during operation of the gas turbine engine.

In another embodiment according to any of the previous embodiments, includes determining if an airfoil leading edge requires maintenance based on the measured actual aeromechanical damping characteristic of the airfoil.

In another embodiment according to any of the previous embodiments, includes determining an acceptable set of engine operating parameters based on the measured actual aeromechanical damping characteristic and constraining operation of the gas turbine engine to maintain the set of engine operating parameters within the acceptable rotational speed.

In another featured embodiment, an airfoil health monitoring system for gas turbine engine includes an actuator mounted proximate a row of airfoils for exciting the row of airfoils. A sensor is mounted proximate the airfoil for measuring a characteristic of the airfoil responsive to excitation by the actuator. A controller is configured to determine an aeromechanical damping characteristic of the row of airfoils based on the measured characteristic in view of excitation by the actuator. The controller is further configured to determine a current flutter characteristic based on the determined actual aeromechanical damping characteristic of the airfoil.

In another embodiment according to the previous embodiment, the controller is further configured to determine if a maintenance activity is warranted based on the comparison of the current flutter characteristic to the predefined flutter boundary and generate an output communicating the required maintenance activity.

In another embodiment according to any of the previous embodiments, the controller is configured to determine a first value of a set of engine operating parameters that initiates airfoil flutter and to determine a flutter boundary and a flutter margin for the set of engine operating parameters.

In another embodiment according to any of the previous embodiments, includes recording measured actual aeromechanical damping characteristics of the airfoil at predefined intervals during operation of the gas turbine engine.

In another embodiment according to any of the previous embodiments, the controller, actuator and sensor are mounted within the gas turbine engine.

In another embodiment according to any of the previous embodiments, the actuator and sensor are configured to be mountable within the gas turbine engine and to communicate with the controller.

In another featured embodiment, a gas turbine engine includes a rotating row of airfoils. An actuator is mounted proximate the rotating row of airfoils for exciting the airfoil. A sensor is mounted proximate the row of airfoils for measuring a characteristic of the airfoil responsive to excitation by the actuator. A controller is mounted proximate the engine and in communication with the actuator and the sensor. The controller is configured to determine an aeromechanical damping characteristic of the row of airfoils based on the measured characteristic in view of excitation by the actuator. The controller is further configured to determine a current flutter characteristic based on the determined actual aeromechanical damping characteristic of the row of airfoils.

In another embodiment according to the previous embodiment, the controller is further configured to determine if a maintenance activity is warranted based on the comparison of the current flutter characteristic to the predefined flutter boundary and generate an output communicating the required maintenance activity.

In another embodiment according to any of the previous embodiments, the controller is configured to determine a first value of a set of engine operating parameters that initiates airfoil flutter and to determine a flutter boundary and a flutter margin for the set of engine operating parameters.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
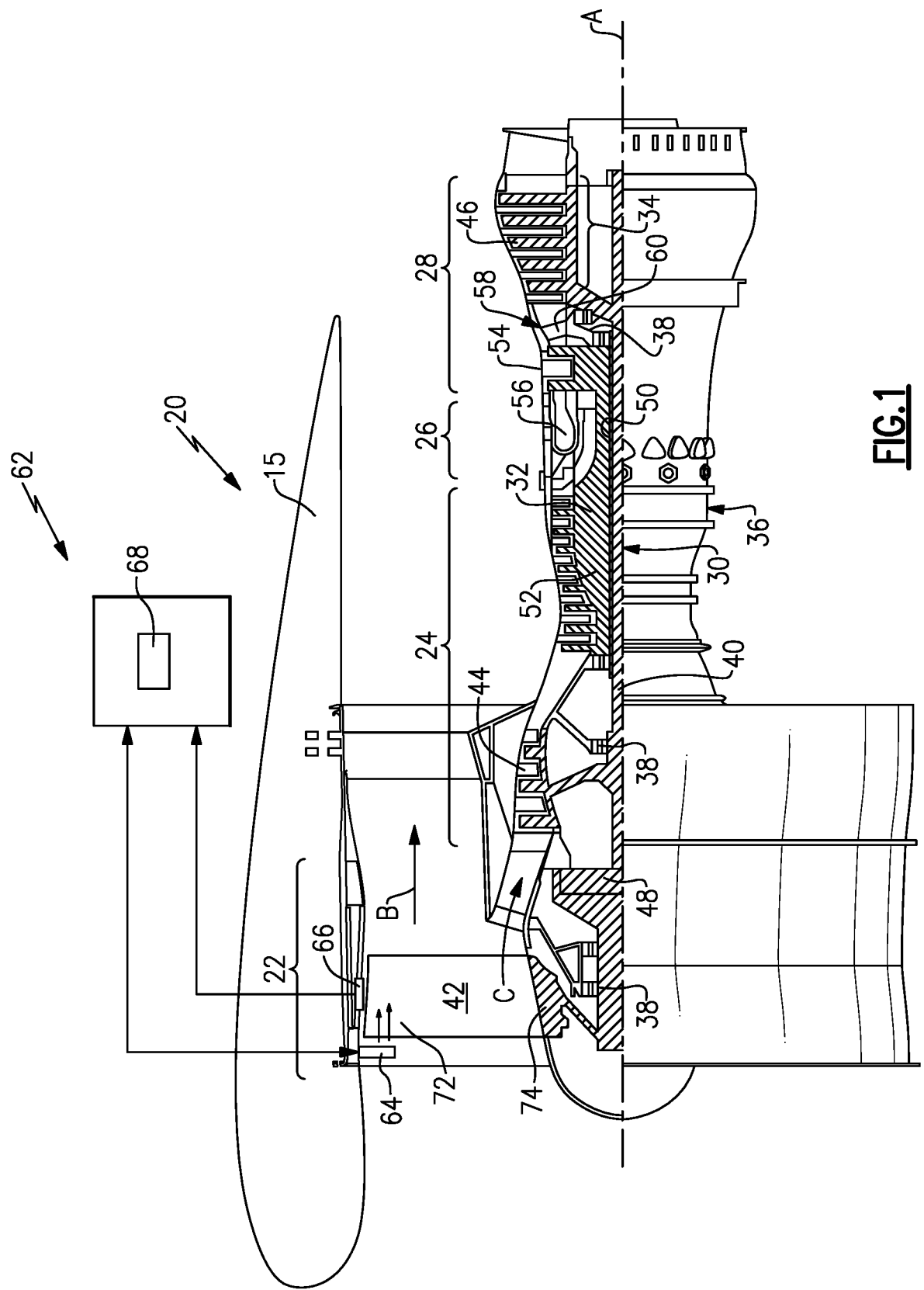
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust for a given period of time that the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
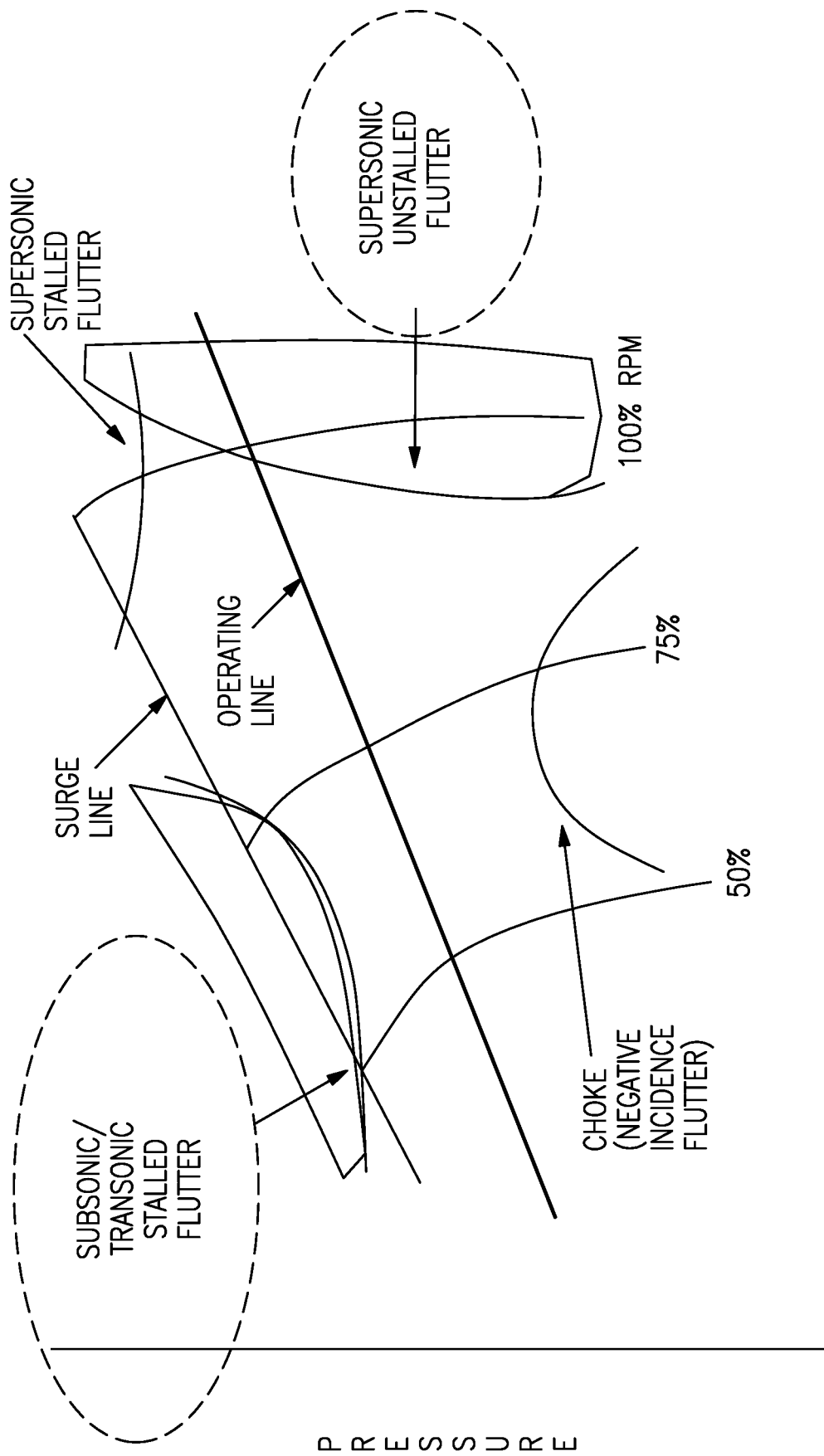
FIG. 2 is a graphical representation of different airfoil flutter modes.

Referring to FIG. 2, with continued reference to FIG. 1, flutter is a phenomenon encountered in flexible structures such as airfoils subjected to aerodynamic forces, such as aircraft wings, fan blades, and other airfoils used in turbomachines. Flutter occurs as a result of interactions between aerodynamics and structural dynamics. A flutter boundary can be defined as a set of conditions for which damping provided by the structure is insufficient to damp out energy being added to the structure by motion-dependent aerodynamic forces. At such a limit the energy input into the airfoil structure is not damped out and instead vibrations build with time and can lead to damage to the airfoil structure.

Turbomachinery manufacturers perform tests to define safe, flutter-free, operating regions of a gas turbine engine. For example, rotor 74 supporting the fan blade 42 may be operated at increased speeds, and/or increasing incidence, while monitoring vibration characteristics with sensors mounted to the fan blades 42. Once self-excited vibrations of a sufficient level are encountered, the rotor 74 and fan blade 42 is returned to a stable operating range and the operating point at which the self-exited vibrations developed is denoted as the flutter boundary. Engine operation is then constrained based on the speeds and/or incidence angle determined to result in flutter. Additionally, a margin is defined such that the engine is not operated near the speeds and or incidence angle associated with the flutter boundary to account for other engine parameters that could cause flutter to occur prior to the determined flutter boundary.

Some engines have operational restrictions due to flutter margin requirements, such as speed restrictions, temperature restrictions etc. Since it is critical to avoid flutter during operations, these restrictions are typically the results of a conservative assumption of the statistical variability of the impact that a range of engine characteristics have on the flutter margin given engine design, manufacture, and operating profiles.

The flutter margin provides for safe operation of the engine at operating levels that do not approach the flutter boundary. Conventional margins are determined using statistical methods to account for various sources of uncertainty in the engine and its operating characteristics that could impact actual flutter margin. The margins are a result of the critical need to avoid flutter during engine operation and the difficulty of detecting initial airfoil flutter during operation short of reaching potentially damaging flutter states.

Aerodynamic damping, or aerodamping, is a measure of the amount of energy either dissipated as a result of vibratory motion (positive aerodamping) or added to the vibratory motion (negative aerodamping) by motion dependent aerodynamic forces. During flutter free operation, aerodamping is typically positive, ie motion dependent aerodynamic forces dissipate, or damp, airfoil vibrations. As operating conditions or other conditions such as leading edge geometry change, the airfoil may approach its flutter boundary. As the airfoil approaches a flutter boundary, the level of aerodamping decreases. Flutter occurs when the sum of the aerodamping and any mechanical damping in the airfoil becomes negative. The reduction in the flutter margin is accompanied with a decrease in aeromechanical damping capability. Thus, the aeromechanical damping of key aeromechanical modes should stay above a certain defined and validated minimum level. A decrease in the aeromechanical damping or decreases faster than an expected rate are an indicator that corrective action may be necessary to prevent flutter.

The disclosed gas turbine engine 20 includes a health monitoring system 62 for monitoring the health of airfoils such as the fan blade 42. The health monitoring system 62 measures aeromechanical damping of an airfoil component, in this example the fan blade 42, to determine if remedial action is required to ensure sufficient flutter margin exists and the engine operates flutter-free. Accordingly, the disclosed system 62 utilizes actual real-time, or near real time measurements on an operating engine to determine blade health rather than reliance on tests conducted at another time and on another engine.

The example health monitoring system includes a means of measuring aeromechanical damping of the fan blade 42. In the disclosed example the means for measurement includes an actuator 64 mounted proximate the fan 42 for exciting the fan blades 42. The example actuator 64 emits or injects a stream of air or gas 72 to excite the fan blades 42. In the disclosed example one actuator 64 is shown mounted forward of the fan blade, however, one or more time varying actuators could be utilized and circumferentially mounted relative to the fan blades 42. The actuator 64 injects the air stream 72 to excite the flutter modes (FIG. 2) of interest near and/or through a resonance frequency of vibration.

The system 62 further includes sensor 66 mounted proximate the fan blade 42 for measuring a characteristic of the fan blade 42 responsive to excitation by the actuator. The example sensor 66 detects deflections of the blade tips by tracking the time at which each successive fan blade 42 passes one or more "time of arrival" sensors mounted on the engine case. The sensor 66 provides an output indicative of the fan blade vibration to a controller 68. Although a blade tip timing system is disclosed, other sensors are also within the contemplation of this disclosure and include, strain gauges, pressure sensors, or any other sensor configured to detect vibration of the fan blade 42. Blade tip timing systems can use a variety of sensors to sense blade arrival, such as optical beam interrupt probes, optical probes that sense a reflection as each blade passes, and capacitance probes. Other sensor configurations and schemes are also within the contemplation of this disclosure.

The controller 68 is configured to determine an aeromechanical damping characteristic of the fan blade 42 based on measurements from the sensor 66 in view of excitation by the actuator 64. The controller 68 is further configured to determine a current flutter characteristic based on an actual aeromechanical damping characteristic of the fan blade 42. The controller 64 therefore provides a means to interpret the response of the fan blades 42 in terms of the aeromechanical damping of one or more relevant aeromechanical modes.

It should be understood that although a disclosed example is described in view of the fan blade 42, that other airfoil structures throughout the gas turbine engine are within the contemplation of this disclosure. Moreover, although a means for measuring aeromechanical damping is disclosed, other methods and devices for measuring aeromechanical damping are within the contemplation of this disclosure.

Figure 3:
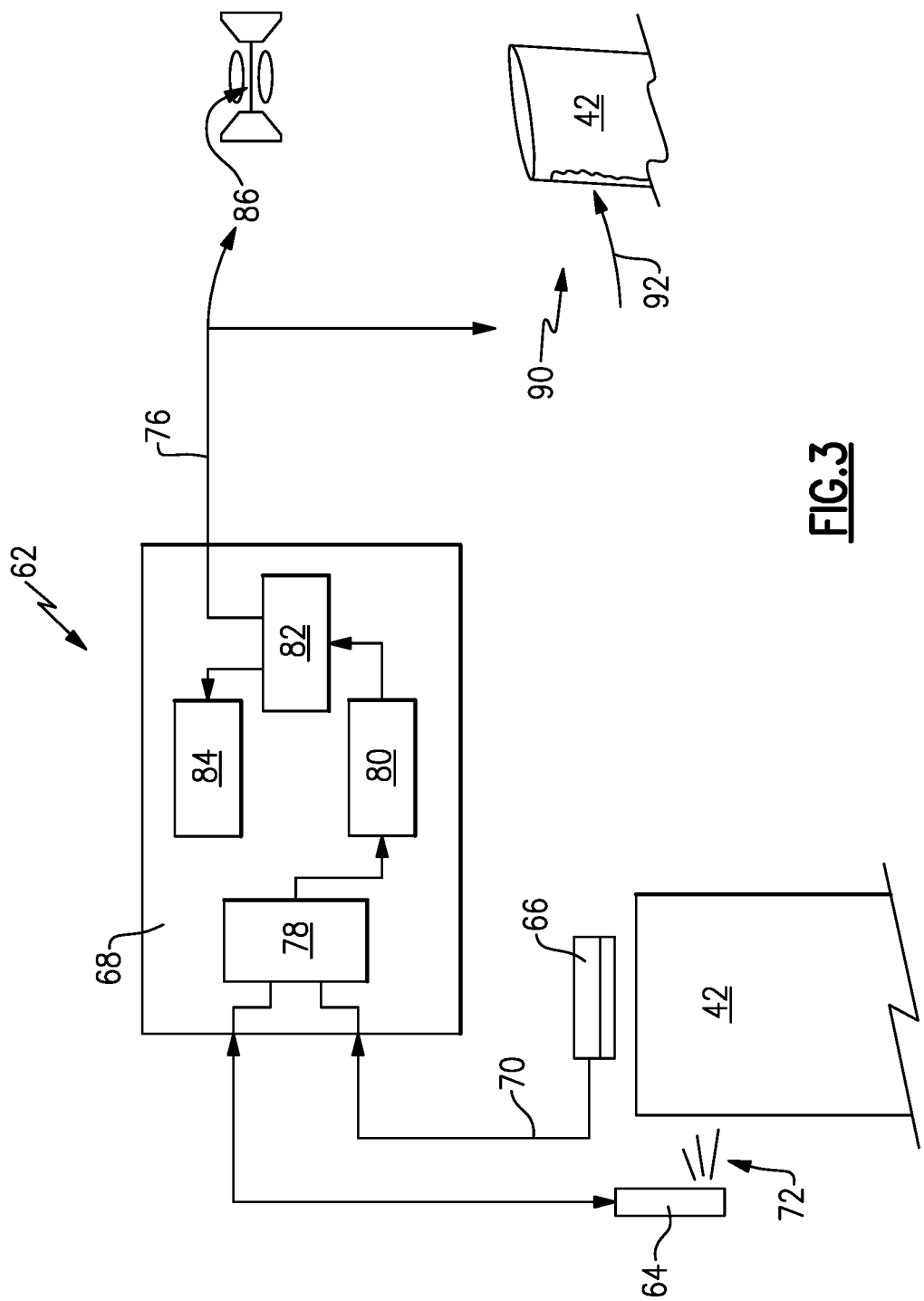
FIG. 3 is a schematic view of an example health monitoring system.

Referring to FIG. 3, with continued reference to FIG. 1, the example, health monitoring system 62 is schematically shown and illustrates schematically the controller 68 having a communication module 78 that receives an output 70 from the sensor 66 indicative of vibrations of the fan blade 42. The module 78 further provides for control of the actuator 64 to excite the fan blade 42. The controller 68 also includes a calculation module 80 that utilizes the information from the sensor 66 in view of operation of the actuator 64 to determine an actual measured aeromechanical damping value for the fan blade 42.

The controller 68 also includes an output module 82 that is configured to provide an output 78 indicative of the measured aeromechanical damping value. The output 78 is utilized to determine if a maintenance activity indicated at 90 or modification to an engine operating constraint schematically indicated at 86 is warranted. One example of an engine operating constraint that could be modified is the reduction in shaft speed to reduce a speed of the fan in some operating conditions.

The decision whether a maintenance operation 90, engine operating constraint 86, or some other remedial action is warranted is based on a comparison of the aeromechanical damping relative to a predefined flutter boundary. In this example a leading edge 92 of the fan blade 42 eroding in use and may require reshaping to restore sufficient flutter margin.

The controller 68 is further configured to determine a first value of an engine operating parameter that initiates airfoil flutter and to determine a flutter boundary and a flutter margin for the engine operating parameter. The controller 68 includes an information storage device 84 that is configured to record measured actual aeromechanical damping characteristics of the airfoil at predefined intervals during operation of the gas turbine engine.

Figure 4:
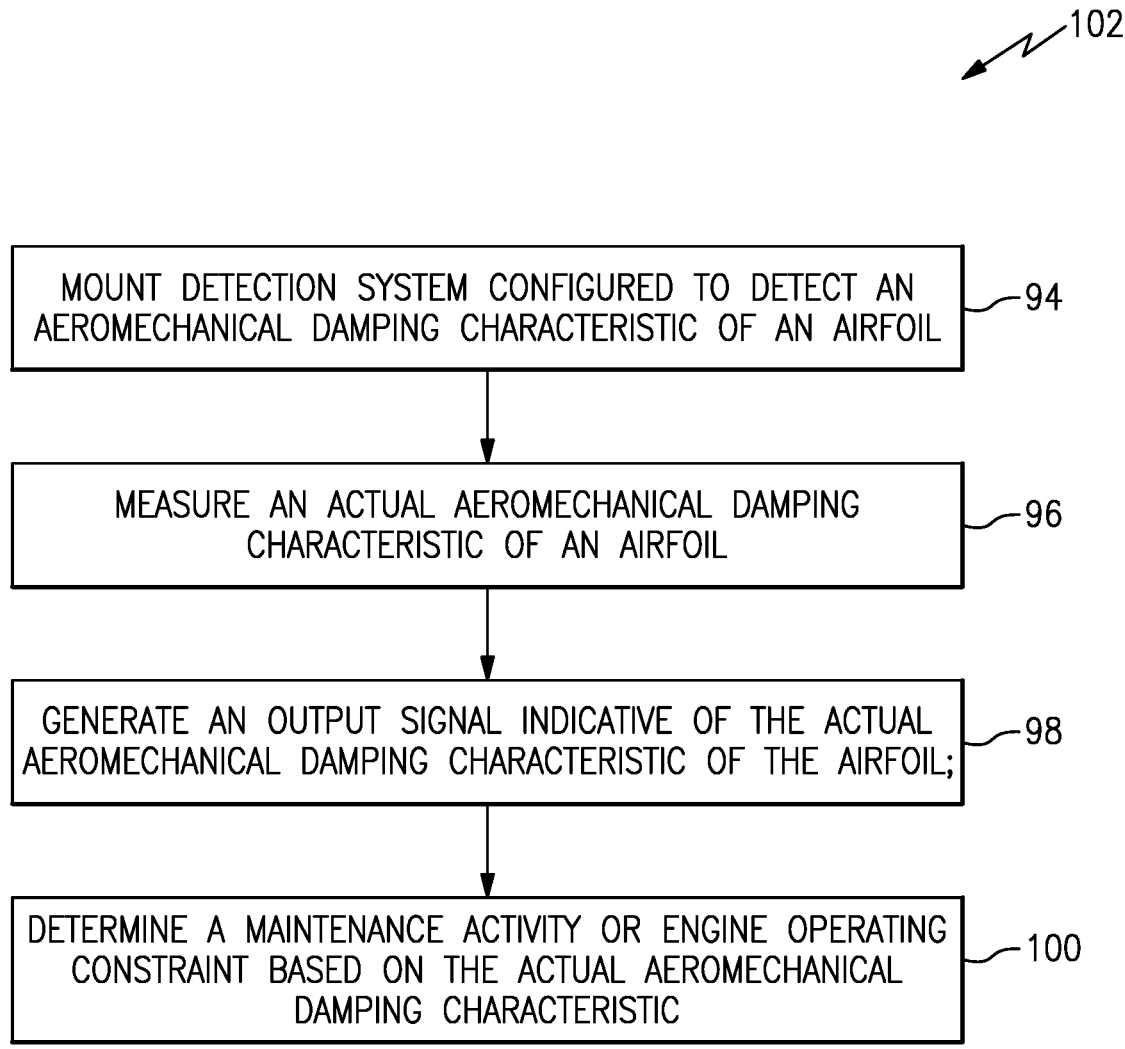
FIG. 4 is flow diagram of a process for determining if remedial measures are warranted based on aeromechanical damping.

Referring to FIG. 4 with continued reference to FIG. 3, a method of measuring aeromechanical damping is schematically indicated at 102 and includes an initial step of mounting the system as indicated at 94, to detect aeromechanical damping characteristics of the fan blade 42 or other airfoil within a gas turbine engine. The health monitoring system 62, may be permanently mounted within the gas turbine engine 20 such that measurement of aeromechanical damping maybe measured without mounting of additional equipment to the engine 20. The system 62 may also be mountable to the engine 20 during periodic maintenance such that the system 62 is not a permanent fixture.

The sensor 66 along with the actuator 64 is then utilized to measure an actual aeromechanical damping characteristic effecting the fan blades 42. Aerodamping is a property of the entire fan. All the fan blades 42 contribute to the aerodamping of any given aeromechanical mode. Any aeromechanical mode where aerodamping becomes negative is in a flutter mode. In this disclosed example, measurements are made by exciting the fan blades 42 with the actuator 64, measuring a vibratory reaction of the airfoil and determining with the controller 68 an aeromechanical damping based on this information. The system further generates an output 76 as indicated at 98 that is indicative of the actual aeromechanical damping characteristic of the fan blade 42.

Based on the determined aeromechanical damping characteristic, maintenance activity or modification to engine operating constraint is made as indicated at 100. The maintenance activity can include rework of one/many/or all leading edges of the fan blades as schematically shown at 90 in FIG. 3. It should be understood that other maintenance actions could also be taken once the actual aeromechanical damping is known. Any activity undertaken in response to an actual measurement of the aeromechanical damping is based on actual knowledge of the individual part and is therefore an improvement over taking action based on testing and statistical determinations made in view of testing on other engines. Moreover, once the action is taken, further testing can be conducted to confirm that the problem has been corrected. The confirmation that a problem is corrected is not typically available when maintenance actions are taken based on a predefined schedule or other non-measurement based criteria. The disclosed system enables such confirmation.

Additionally, based on the aeromechanical damping measured by the system, a current flutter characteristic can be ascertained. The flutter characteristic in one example is the remaining flutter margin available. The remaining flutter margin may be compared to a predefined flutter boundary for that engine or part to provide an indication of some action is required. The system 62 further provides the determination that at least one of a maintenance activity and/or modification to engine operating constraints is warranted based on the comparison of the determined aeromechanical damping in view of any remaining flutter margin relative to the predefined flutter boundary.

The system 62 may therefore be utilized to determine the flutter boundary. In one disclosed operational embodiment the system is utilized to determine a first value of an engine operating parameter that initiates airfoil flutter. The first value may include a set of operating parameters including, among other possible parameters, a pressure ratio across the row of fan blades in combination with other engine operating parameters, for example rotor speed, at which the aeromechanical damping for the fan blades reaches a minimum threshold value. The point where the aeromechanical damping reaches a minimum threshold value provides an indication of at what set of engine operating parameters the flutter boundary is reached. The system 62 may then be utilized to define a flutter margin for the set of engine operating parameters. Accordingly, a first set of engine operating parameters is determined that corresponds with the flutter boundary and a second set of engine operating parameters can be determined to define a flutter margin. The difference between the first set of engine operating parameters and the second set of engine operating parameters is used to determine the amount of available flutter margin.

The controller 68 memory module, indicated schematically at 84 provides for recording of measured actual aeromechanical damping characteristics of the blade row at predefined intervals during operation of the gas turbine engine. The recorded information is utilized to determine when remedial action is required. Remedial action in the form of a maintenance activity would be indicted when the aeromechanical damping reaches a threshold value. In one example, the maintenance activity includes attention to the leading edge 92 as schematically shown at 90. It should be understood, that the fan blade leading edge 92 is only one example of engine maintenance that could be used to address and improve aeromechanical damping. Other actions such as component replacement are within the contemplation of this disclosure as are operational restrictions for the engine.

The example system 62 enhances the effectiveness of any maintenance procedure by utilizing actual measurements that enable a potential issue effecting flutter to be quantified and optimized, as opposed to using overly conservative criteria.

Accordingly, the disclosed system 62 uses a measured aeromechanical damping to determine the type of restrictions required by any given engine. If the aeromechanical damping drops below a certain value, or decreases faster than an expected rate, maintenance is required. Additionally, storing the time history of aeromechanical damping levels over time is a useful diagnostic tool for optimizing engine life cycle costs.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of health monitoring of a gas turbine engine comprising:
   mounting a detection system configured to detect an aeromechanical damping characteristic of a row of airfoils of a gas turbine;
   injecting a stream of air or gas at the row of airfoils to excite the row of airfoils;
   measuring an actual aeromechanical damping characteristic of the row of airfoils with the detection system;
   generating an output signal indicative of the actual aeromechanical damping characteristic of the row of airfoils;
   determining a current flutter characteristic based on the output signal indicative of the actual aeromechanical damping characteristic of the row of airfoils; and
   determining a set of engine parameters that define a flutter boundary and defining a flutter margin for the set of engine operating parameters at a value of the set engine operating parameters such that the set of engine operating parameters does not approach the flutter boundary.

2. The method as recited in claim 1, including comparing the determined flutter characteristic to a predefined flutter boundary and determining if at least one of a maintenance activity and modification to engine operating constraints is warranted based on the comparison of the determined flutter characteristic to the predefined flutter boundary.

3. The method as recited in claim 1, including determining the flutter boundary by measuring aeromechanical damping at non-flutter operating conditions and predicting the flutter boundary based on changes to aeromechanical damping at the non-flutter operating conditions.

4. The method as recited in claim 3, wherein the aeromechanical damping characteristic comprises a zero aeromechanical damping value.

5. The method as recited in claim 3, including determining an aeromechanical damping characteristic of the engine operating parameter and defining the flutter margin based on the determined aeromechanical damping characteristic.

6. The method as recited in claim 5, including constraining engine operation based on the aeromechanical damping characteristic corresponding with the engine operating parameter.

7. The method as recited in claim 1, including recording measured actual aeromechanical damping characteristics of the row of airfoils at predefined intervals during operation of the gas turbine engine.

8. The method as recited in claim 1, including determining if an airfoil leading edge requires maintenance based on the measured actual aeromechanical damping characteristic of the airfoil.

9. The method as recited in claim 1, including determining an acceptable set of engine operating parameters based on the measured actual aeromechanical damping characteristic and constraining operation of the gas turbine engine to maintain the set of engine operating parameters within the acceptable set of operating parameters.

10. An airfoil health monitoring system for a gas turbine engine comprising:
    an actuator mounted proximate a row of airfoils for exciting the row of airfoils;
    a sensor mounted proximate the row of airfoils for measuring a characteristic of the airfoil responsive to excitation by the actuator, the actuator configured to inject a stream of air or gas against the row of airfoils to excite the airfoils; and
    a controller configured to determine an aeromechanical damping characteristic of the row of airfoils based on the measured characteristic in view of excitation by the actuator, wherein the controller is further configured to determine a current flutter characteristic based on the determined actual aeromechanical damping characteristic of the of the row of airfoils and to determine a first value of a set of engine operating parameters that initiates airfoil flutter and to determine a flutter boundary and a flutter margin for the set of engine operating parameters.

11. The airfoil health monitoring system as recited in claim 10, wherein the controller is further configured to determine if a maintenance activity is warranted based on the comparison of the current flutter characteristic to a predefined flutter boundary and generate an output communicating the required maintenance activity.

12. The airfoil health monitoring system as recited in claim 10, including recording measured actual aeromechanical damping characteristics of the airfoil at predefined intervals during operation of the gas turbine engine.

13. The airfoil health monitoring system as recited in claim 10, wherein the controller, actuator and sensor are mounted within the gas turbine engine.

14. The airfoil health monitoring system as recited in claim 10, wherein the actuator and sensor are configured to be mountable within the gas turbine engine and to communicate with the controller.

15. A gas turbine engine comprising:
    a rotating row of airfoils;
    an actuator mounted proximate the rotating row of airfoils for exciting the row of airfoil, the actuator configured for injecting a stream of air or gas against the row of airfoils to excite the airfoils;

a sensor mounted proximate the row of airfoils for measuring a characteristic of the row of airfoils responsive to excitation by the actuator; and a controller mounted proximate the engine and in communication with the actuator and the sensor, the controller configured to determine an aeromechanical damping characteristic of the row of airfoils based on the measured characteristic in view of excitation by the actuator, wherein the controller is further configured to determine a current flutter characteristic based on the determined actual aeromechanical damping characteristic of the row of airfoils and to determine a first value of a set of engine operating parameters that initiates airfoil flutter and to determine a flutter boundary and a flutter margin for the set of engine operating parameters.

16. The gas turbine engine as recited in claim 15, wherein the controller is further configured to determine if a maintenance activity is warranted based on the comparison of the current flutter characteristic to a predefined flutter boundary and generate an output communicating the required maintenance activity.

* * * * *